Patented Nov. 8, 1949

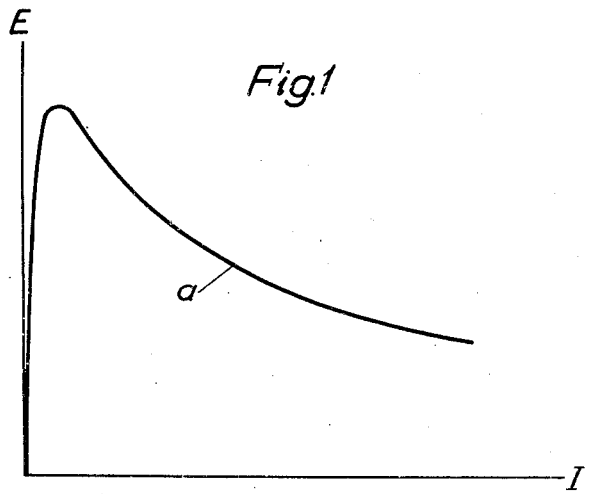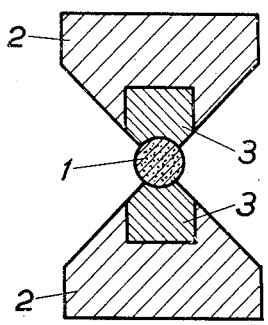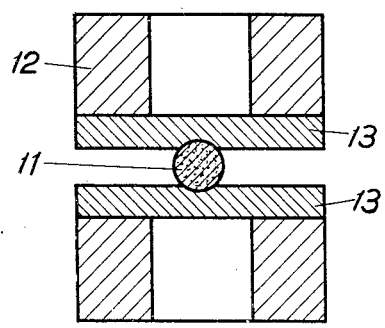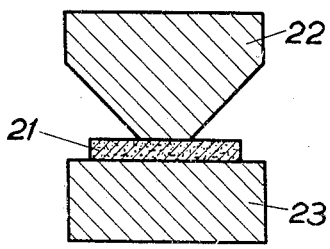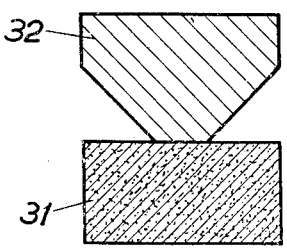
Inventor
Bertil Stålhane
By James Aiken
Attorney.

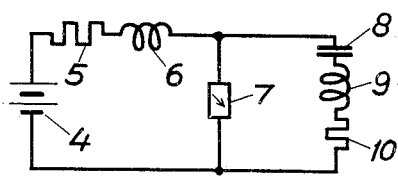
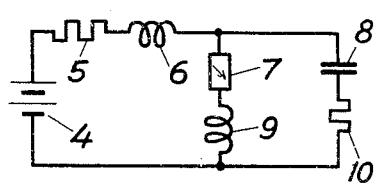
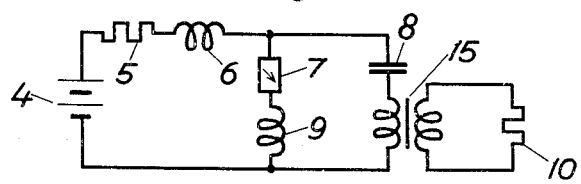
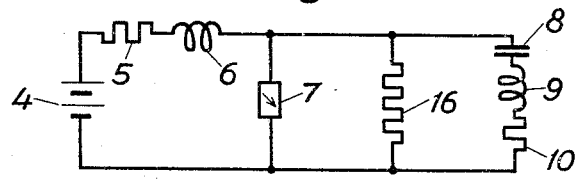
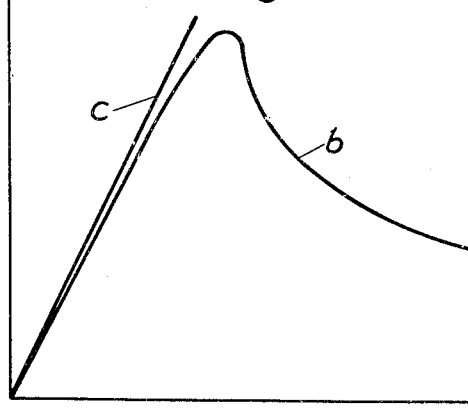

2,487,279

UNITED STATES PATENT OFFICE 2,487,279

MEANS FOR GENERATING ALTERNATING CURRENTS

Bertil Stålhane, Stockholm, Sweden, assignor to Allmanna Svenska Elektriska Aktiebolaget, Vasteras, Sweden, a corporation of Sweden Application December 24, 1946, Serial No. 718,197
In Sweden December 29, 1945

10 Claims. (Cl. 250—36)

It is known to generate or to influence an alternating current by means of an oscillating circuit containing a resistor with a negative temperature coefficient in the shape of a solid conductor, from which the heat is conducted essentially by metallic parts. The present invention provides a very simple and efficient connection of this type, the efficiency of which mainly depends on the fact that the metallic heat conductors serve at the same time as external current conductors for the thermo-negative resistor, which is for instance caused, by a basic load of direct current, to operate within such load limits that the derivative of the voltage across the resistor with respect to the traversing current is negative. In this way it is possible to obtain even at moderate temperatures such a large heat conduction in relation to the heat capacity of the resistor, that is, to keep so large direct current load, that reasonable values of the alternating current power and of the frequency can be obtained. The heat capacity is under otherwise equal conditions proportional to the volume of the body, while the heat conduction per degree and time unit is proportional to its surface. The active alternating current power depends not only on the direct current load within the aforesaid limits but also on the value of the derivative of the voltage with respect to the current within these limits. The highest or most favorable frequency, at which the system operates, depends on the characteristic of the resistor and also on the proportion between load and heat capacity. The most favorable frequency will therefore be substantially proportional to the ratio between the heat conduction and heat capacity and thus under otherwise equal conditions inversely proportional to the linear dimension of the resistor. For obtaining a reasonably high frequency it is therefore necessary to keep the dimensions of the resistor rather small, and therefore only a comparatively small power may be obtained. The resistors are intended to operate mainly at frequencies between 1 and 100 cycles per second.

On the accompanying drawing Fig. 1 shows the current-voltage characteristic of a resistor to be used according to the present invention, and Figs. 2-5 four different forms of the resistor with its heat conducting members in a side view. Figs. 6-9 show four different connections of oscillating circuits, in which the resistor may be connected. Fig. 10 shows a modified current-voltage diagram for the connection according to Fig. 9.

In Fig. 1 the abscissae I show the current through a resistor and the ordinates E the voltage across the same. The curve A designates the voltage as a function of the current for pure direct current, when the temperature thus has time to adjust itself entirely according to the heat developed in the resistor and the heat conduction. The resistor may for instance consist of an alloy of different metal oxides, as cupric oxide and cuprous oxide. The characteristic is as shown—paying respect to the temperature dependency of the resistor—such, that not only the ratio $$\frac{E}{I}$$

continuously decreases at increasing I but also the derivative $$\frac{dE}{dI}$$

becomes negative along a portion of the curve, for instance in resistors of a certain composition beginning from a temperature of about 100° C. The most favorable operation of such a resistor is obtained substantially between the temperature limits 120° C. and 300° C.

A mathematical investigation of the operation of such a resistor connected in an alternating current circuit shows that the current always will be retarded in phase with respect to the alternating voltage impressed and that the phase difference will be the greater the lower the frequency is. Up to a certain frequency the phase difference will be larger than 90°, which means that the resistance for alternating current is negative and that the arrangement thus has the property of generating an oscillation under the influence of a direct current.

The condition for obtaining the aforesaid operation at frequencies between 1 and 100 cycles per second is, as already mentioned, that the heat conduction is large compared with the heat capacity. For accomplishing this the dimensions of the thermo-negative resistor should be small. Its minimum dimension should thus, as a rule, not exceed 1 mm.

The four forms of the resistor with heat conducting metal members shown in Figs. 2-5 are represented in a considerably magnified scale. The mentioned metallic members serve as current conductors. In Figs. 2 and 3 the resistor 1 is spherical. In Fig. 2 it is embraced by two conical metallic members 2, being spherically concave at their vertices. The rapidly growing heat conducting section of these bodies, counted from the resistor 1, makes the gradient of temperature in these conductors substantially limited to small masses close to the resistor, which in its turn makes the effective heat capacity low. This condition can be made still more accentuated by constructing the portions 3 of the metallic members lying closely to the resistor 1 of a metal having a smaller heat conductivity than the rest. For instance, the portions 3 may be made of iron or nickel and the rest of silver. It is true that the total heat conduction is somewhat reduced in this way, but at the same time the heat capacity is reduced, whence an increase of the frequency will be possible in this way. Especially iron and nickel have also the favorable property that their heat conductivity is reduced at an increase of temperature.

In Fig. 3, the metallic members 12 are in the shape of hollow cylinders and their end surfaces facing the resistor 11 are lined with plate washers 13, which are spherically concave to fit the resistor. The portions 13 may, in analogy with the portions 3 in Fig. 2, be made of a metal having a comparatively low heat conductivity. The heat conduction from the resistor is thus essentially radial in this form.

In Figs. 2 and 3 the electric and thermal contact between the resistor and the metallic heat contacts may preferably be improved by a layer of silver or other resistant, well conducting and comparatively soft metal, said layer being obtained by electrolysis or by heat treatment of an organic compound, and in such case, separate cavities in the metal may be omitted.

In Fig. 4, the resistor 21 is shaped as a washer and enclosed between a metallic member of truncated conical shape 22 and a cylindrical member 23.

In Fig. 5, the resistor 1 has larger dimensions than the portion thereof, which is efficient for creating the oscillations, said portion consisting of the portion lying close to the metallic cone 32, while the portions at greater distance from this cone have a small heat conduction and therefore small heat variations. This device is, as a rule, of less favorable action than those illustrated in Figs. 2–4, but may still in some cases be used. The metallic electrode opposite to the member 22 is not shown in Fig. 5 but may have either a corresponding conical shape or another shape. In the former case, there will be a portion efficient for creating the oscillations at the other electrode, while in the second case the contact place there may be less efficient for creating oscillations.

Different examples of oscillating circuits, of which a resistor, operating according to the present invention, may form part, are shown in Figs. 6–9. The resistor is in these figures conventionally shown as a rectangle having an arrow directed downwards to the right, indicating its negative characteristic.

In all the figures, a direct current source 4 feeds an oscillating circuit across a resistor 5 and a reactor 6, which latter keeps the value of the direct current substantially constant, while the resistor 5 essentially determines its value. The oscillating circuit consists of two branches parallel with respect to the direct current, one of said branches containing in Fig. 6 only the thermo-negative resistor 7, while the other contains a condenser 8, a reactor 9 and a load resistance 10 in series. Through the three last mentioned elements, a pure alternating current circulates, which in the resistor 7 is alternately added to and subtracted from the constant direct current.

In Fig. 7, the reactor 9 is placed in the same position as the thermo-negative resistor 7. Otherwise the connection is analogous to that of Fig. 6 and operates substantially in the same manner.

Fig. 8 shows the modification with respect to Fig. 7, that the load resistance 10 is connected to the oscillating circuit through a transformer 15. This will cause no substantial modification in the operation.

As the thermo-negative resistor, on account of its heat capacity, behaves substantially as an inductance with respect to the alternating current, a separate reactor in the oscillating circuit may be omitted. The capacitor may be replaced by an impedance element operating in analogy therewith. The aforesaid inductive character of the resistor may also be employed for influencing an alternating current generated in another way.

Fig. 9 shows a connection of the oscillating circuit, which causes a somewhat modified operation illustrated by Fig. 10. Fig. 9 comes rather close to Fig. 6, but differs from the latter by the circumstance that an essentially constant or possibly voltage-dependent resistor 16 is connected in parallel to the thermo-negative resistor. The voltage-current characteristic of these two resistors together has, for a constant value of the resistor 16, substantially the shape of the curve $b$ in Fig. 10, the abscissae of which are composed of the abscissae of the curve $a$ in Fig. 1 and of the straight resistance line $c$. Since the curve $b$ has a greater slope than the curve $a$ within the limits of the oscillations, the variations of the voltage for the same variations of the current will be larger. The resistor 16, however, absorbs a constant direct current power, whence the efficiency of this modification will be inferior to that of Fig. 6.

I claim as my invention:

1. Means for generating an alternating current, comprising a current source, a solid resistor having a negative temperature coefficient, metallic electric and heat conductors in contact therewith, the dimension of the material of said conductors increasing rapidly with increasing distance from the surface of contact with the resistor as compared with the area of said contact surface, means for imparting a basic direct current load to said resistor to make it operate with a negative time derivative of voltage with respect to current, and an impedance of a capacitative character connected to said resistor to form an oscillatory circuit.

2. Means for generating an alternating current, comprising a current source, a solid resistor having a negative temperature coefficient, metallic electric and heat conductors in contact therewith, the dimension of the material of said conductors increasing rapidly with increasing distance from the surface of contact with the resistor as compared with the area of said contact surface, and said conductors consisting of a metal of a heat conductivity decreasing with increasing temperature, means for imparting a basic direct current load to said resistor to make it operate with a negative time derivative of voltage with respect to current, and an impedance of a capacitative character connected to said resistor to form an oscillatory circuit.

3. Means for generating an alternating current, comprising a current source, a substantially spherical solid resistor having a negative temperature coefficient, metallic electric and heat conductors in contact therewith for conducting current therethrough and heat therefrom, the dimension of the material of said conductors increasing rapidly with increasing distance from the surface of contact with the resistor, as compared with the area of said contact surface, means for imparting a basic direct current load to said resistor to make it operate with a negative time derivative of voltage with respect to current, and an impedance of a capacitative character connected to said resistor to form an oscillatory circuit.

4. Means for generating an alternating current, comprising a current source, a solid resistor having a negative temperature coefficient, metallic electric and heat conductors of a cross-sectional area rapidly diverging from the surface of contact with said resistor and being of truncated conical shape with spherical cavities embracing said spherical resistor, means for imparting a basic direct current load to said resistor to make it operate with a negative time derivative of voltage with respect to current, and an impedance of a capacitative character connected to said resistor to form an oscillatory circuit.

5. Means for generating an alternating current, comprising a current source, a solid resistor having a negative temperature coefficient, metallic electric and heat conductors of a cross-sectional area rapidly diverging from the surface of contact with said resistor and consisting of washers supported at the ends of hollow cylinders and having cavities embracing said spherical resistor, means for imparting a basic direct current load to said resistor to make it operate with a negative time derivative of voltage with respect to current, and an impedance of a capacitative character connected to said resistor to form an oscillatory circuit.

6. Means for generating an alternating current, comprising a current source, a solid resistor having a negative temperature coefficient, metallic electric and heat conductors having silver-covered surfaces in contact with said resistor, the dimension of the material of said conductors increasing rapidly with increasing distance from the surface of contact with the resistor, as compared with the area of said contact surface, means for imparting a basic direct current load to said resistor to make it operate with a negative time derivative of voltage with respect to current, and an impedance of a capacitative character connected to said resistor to form an oscillatory circuit.

7. Means for generating an alternating current, comprising a current source, a solid resistor having a negative temperature coefficient in the shape of a plate, metallic electric and heat conductors having plane surfaces resting against said plate, the dimension of the material of said conductors increasing rapidly with increasing distance from the surface of contact with the resistor, as compared with the area of said contact surface, means for imparting a basic direct current load to said resistor to make it operate with a negative time derivative of voltage with respect to current, and an impedance of a capacitative character connected to said resistor to form an oscillatory circuit.

8. Means for generating an alternating current, comprising a current source, a solid resistor having a negative temperature coefficient, metallic electric and heat conductors in contact therewith for conducting current therethrough and heat therefrom, the dimension of the material of said conductors increasing rapidly with increasing distance from the surface of contact with the resistor, as compared with the area of said contact surface, means for imparting a basic direct current load to said resistor to make it operate with a negative time derivative of voltage with respect to current, an approximately constant resistor connected in parallel to said thermonegative resistor, and an impedance of a capacitative character connected to said resistor to form an oscillatory circuit.

9. Means for generating an alternating current, comprising a current source, a solid resistor composed of metal oxides and having a negative temperature coefficient, metallic electric and heat conductors in contact therewith for conducting current therethrough and heat therefrom, the dimension of the material of said conductors increasing rapidly with increasing distance from the surface of contact with the resistor, as compared with the area of said contact surface, means for imparting a basic direct current load to said resistor to make it operate with a negative time derivative of voltage with respect to current, and an impedance of a capacitative character connected to said resistor to form an oscillatory circuit.

10. Means for generating an alternating current, comprising a current source, a solid resistor having a negative temperature coefficient, metallic electric and heat conductors in contact therewith for conducting current therethrough and heat therefrom, the dimension of the material of at least one of said conductors increasing rapidly with increasing distance from the area of contact with the resistor as compared with the area of said area of contact, means for imparting a basic direct current load to said resistor to make it operate with a negative time derivative of voltage with respect to current, and an impedance of a capacitative character connected to said resistor to form an oscillatory circuit.

BERTIL STÅLHANE.

REFERENCES CITED

The following references are of record in the file of this patent:

UNITED STATES PATENTS

| Number | Name | Date |
| --- | --- | --- |
| 2,406,804 | Chatterjea | Sept. 3, 1946 |